US010232298B2

(12) United States Patent
Kikuchi et al.

(10) Patent No.: US 10,232,298 B2
(45) Date of Patent: *Mar. 19, 2019

(54) HONEYCOMB STRUCTURE

(71) Applicant: NGK INSULATORS, LTD., Nagoya (JP)

(72) Inventors: Yoshio Kikuchi, Nagoya (JP); Masaki Ishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 261 days.

This patent is subject to a terminal disclaimer.

(21) Appl. No.: 15/062,482

(22) Filed: Mar. 7, 2016

(65) Prior Publication Data

US 2016/0271548 A1  Sep. 22, 2016

(30) Foreign Application Priority Data

Mar. 20, 2015 (JP) ................. 2015-058562

(51) Int. Cl.
*B01D 46/24* (2006.01)
*C04B 35/515* (2006.01)
(Continued)

(52) U.S. Cl.
CPC ..... *B01D 46/2429* (2013.01); *B01D 46/2474* (2013.01); *B01J 35/04* (2013.01); *C04B 35/515* (2013.01); *C04B 38/0006* (2013.01); *C04B 38/0009* (2013.01); *C04B 38/0016* (2013.01); *F01N 3/0222* (2013.01); *F01N 3/0275* (2013.01); *B01D 2046/2433* (2013.01); *B01D 2046/2437* (2013.01); *C04B 2111/0081* (2013.01); *C04B 2111/00793* (2013.01); *C04B 2235/3206* (2013.01);

(Continued)

(58) Field of Classification Search
None
See application file for complete search history.

(56) References Cited

U.S. PATENT DOCUMENTS 7,011,803 B2   3/2006 Ichikawa et al.
8,716,635 B2   5/2014 Noguchi et al.
(Continued)

FOREIGN PATENT DOCUMENTS

EP   1 698 388 A1   9/2006
JP   4136319          8/2008
(Continued)

OTHER PUBLICATIONS

U.S. Appl. No. 15/062,506, filed Mar. 7, 2016, Kikuchi et al.
Extended European Search Report (Application No. 16160283.4) dated Jul. 27, 2016.

*Primary Examiner* — Daniel J. Schleis
(74) *Attorney, Agent, or Firm* — Burr & Brown, PLLC

(57) ABSTRACT

A honeycomb structure includes a pillar-shaped honeycomb structure body having a porous partition wall. The honeycomb structure body includes a plurality of cells defined by the partition wall so as to extend from a first end face to a second end face of the honeycomb structure body, the partition wall is formed by a porous body including a silicon phase as a main phase, and the silicon phase as the main phase has content of each of metals other than silicon and metals making up silicide that is 0.3 part by mass or less with respect to 100 parts by mass of silicon.

18 Claims, 7 Drawing Sheets

(51) Int. Cl.
*C04B 38/00* (2006.01)
*B01J 35/04* (2006.01)
*F01N 3/022* (2006.01)
*F01N 3/027* (2006.01)
*C04B 111/00* (2006.01)

(52) U.S. Cl.
CPC .............. *C04B 2235/3217* (2013.01); *C04B 2235/3418* (2013.01); *C04B 2235/428* (2013.01); *C04B 2235/80* (2013.01); *C04B 2235/85* (2013.01)

(56) References Cited

U.S. PATENT DOCUMENTS

| | | |
|---|---|---|
| 2004/0051196 A1 | 3/2004 | Otsuka et al. |
| 2005/0023736 A1* | 2/2005 | Matsuzaki ......... B01D 46/2418 264/630 |
| 2006/0192324 A1 | 8/2006 | Kaneda et al. |
| 2012/0076699 A1* | 3/2012 | Ishihara ................ F01N 3/2026 422/174 |
| 2014/0294692 A1* | 10/2014 | Kikuchi ................ F01N 3/2828 422/180 |

FOREIGN PATENT DOCUMENTS

| | | |
|---|---|---|
| JP | 2014-193782 | 10/2014 |
| WO | 2011/043434 | 4/2011 |

* cited by examiner

HONEYCOMB STRUCTURE

The present application is an application based on JP 2015-058562 filed on Mar. 20, 2015 with the Japan Patent Office, the entire contents of which are incorporated herein by reference.

BACKGROUND OF THE INVENTION

Field of the Invention

The present invention relates to honeycomb structures. More particularly the present invention relates to a honeycomb structure with low heat capacity and high thermal diffusivity and that follows the ambient temperature change rapidly.

Description of the Related Art

Exhaust gas emitted from an internal combustion engine, such as a diesel engine and a gasoline engine, or various types of combustion devices contain a lot of particulate substances (hereinafter called "particulate matter" or "PM" as well) mainly containing soot. If this PM is discharged directly to the air, environment pollution will be caused, and so an exhaust system for exhaust gas includes a particulate filter to trap PM. For instance, examples of a particulate filter used to purify exhaust gas emitted from a diesel engine or a gasoline engine include a diesel particulate filter (DPF) or a gasoline particulate filter (GPF). Such a DPF or a GPF includes a honeycomb structure, for example, having a porous partition wall defining a plurality of cells serving as a through channel of exhaust gas.

The exhaust gas as stated above contains harmful substances, such as NOx, CO and HC as well. In order to reduce the amount of harmful substances in exhaust gas to purify the exhaust gas, catalyst reactions are widely used. For the purification of exhaust gas using such a catalyst reaction, a honeycomb structure is used as a catalyst carrier to load a catalyst.

As the honeycomb structure, there is proposed, for example, a honeycomb structure formed by a porous sintered body which contains silicon as a main component where silicon components are covalently bonded, and which has the porosity of 20 to 70% (see Patent Document 1, for example). Moreover, as the honeycomb structure, there is proposed another honeycomb structure which includes refractory particles as aggregate and metallic silicon, and which is porous and has the porosity in the range of 30 to 90% (see Patent Document 2, for example). The honeycomb structure described in Patent Document 2 has a structure in which the refractory particles are bonded together by means of metallic silicon partially at the surface of the refractory particles, and the content of the metallic silicon is within the range of 10 to 45% by weight with respect to the total amount of the refractory particle and the metallic silicon.

Another honeycomb structure functioning as a heater as well as the catalyst carrier also is proposed (see Patent Document 3, for example). For instance, the honeycomb structure described in Patent Document 3 includes a honeycomb structure body having a partition wall and a circumferential wall, and a pair of electrode members disposed laterally on the honeycomb structure body. This honeycomb structure is configured so that, when electricity is applied to the pair of electrode members, the honeycomb structure body produces heat. In the honeycomb structure described in Patent Document 3, the partition wall and the circumferential wall contain silicon carbide particles as the aggregate and silicon as the bonding agent to bond the silicon carbide particles. Then, in order to exert appropriate heat-production characteristics, the honeycomb structure body has volume resistivity at 400° C. that is 1 to 40 Ωcm, and the electrode members have volume resistivity at 400° C. that is 40% or less of the volume resistivity of the honeycomb structure body at 400° C.

Herein since pressure loss increases gradually over time in the honeycomb filters, such as DPF, due to PM deposited inside of the filter, regeneration of such a filter in which PM deposited inside of the honeycomb filter is combusted for removal is often performed in a periodical interval. For instance, as a method for regeneration of a DPF, a regeneration method is known, including raising the temperature of exhaust gas emitted from an engine, and heating the DPF using the high-temperature exhaust gas. As a method for raising the temperature of exhaust gas, an example of the method includes post-injection to temporarily inject fuel excessively at the latter half of the explosion stroke or at the exhaust stroke so as to combust the excessive fuel and so raise the temperature of the exhaust gas. Then, when a honeycomb filter is regenerated by the regeneration method as stated above, it is desirable that the honeycomb filter follow rapidly the ambient temperature change in terms of improvement of fuel efficiency. In order to allow the honeycomb filter to follow the ambient temperature change rapidly, a method of controlling the heat capacity or the thermal diffusivity of the honeycomb filter can be considered, for example.

[Patent Document 1] JP-A-2014-193782
[Patent Document 2] JP-B-4136319
[Patent Document 3] WO 2011/043434

SUMMARY OF THE INVENTION

Herein, in order to control the heat capacity or the thermal diffusivity of a porous sintered body containing silicon as a main component, the porosity thereof has to be controlled. A porous sintered body containing silicon as a main component, however, has a problem that sintering due to surface diffusion occurs preferentially over sintering due to volume diffusion, and so it is difficult to lower the porosity. The honeycomb structure described in Patent Document 1 includes metals such as Al, Fe, Ni, Ti, B, P, and Ca as sintering aid so as to obtain a porous sintered body containing silicon as a main component. Such sintering aid has a melting point lower than that of silicon, and so the formed body obtained by extrusion of a forming raw material has a low melting point locally at the part containing such sintering aid. This means that, when such a formed body is sintered, sintering is progressed locally at the part containing the sintering aid, which leads to a problem that the obtained honeycomb structure has lower thermal diffusivity. In addition, there is another problem that locally progressed sintering reduces strength of the honeycomb structure and reduces trapping performance of the honeycomb structure when it is used as a filter.

The honeycomb structure described in Patent Document 2 includes silicon carbide particles mainly as the refractory particles, and so has a problem that the heat capacity of the honeycomb structure is large and the temperature-rising property is poor. That is, the honeycomb structure described in Patent Document 2 has the difficulty to follow the ambient temperature change rapidly.

The honeycomb structure described in Patent Document 3 also has a problem of large heat capacity and poor temperature-rising property similarly to the honeycomb structure described in Patent Document 2 because it includes silicon carbide particles as the aggregate.

In view of such problems, the present invention aims to provide a honeycomb structure with low heat capacity and high thermal diffusivity and that follows the ambient temperature change rapidly.

To solve the above problems, the present invention provides the following honeycomb structure.

According to a first aspect of the present invention, a honeycomb structure is provided, includes a pillar-shaped honeycomb structure body having a porous partition wall, wherein the honeycomb structure body includes a plurality of cells defined by the partition wall so as to extend from a first end face to a second end face of the honeycomb structure body, the partition wall is formed by a porous body including a silicon phase as a main phase, and the silicon phase as the main phase has content of each of metals other than silicon and metals making up silicide that is 0.3 part by mass or less with respect to 100 parts by mass of silicon.

According to a second aspect of the present invention, the honeycomb structure according to the first aspect is provided, wherein the porous body includes 70 mass % or more of the silicon phase as the main phase.

According to a third aspect of the present invention, the honeycomb structure according to the first or second aspects is provided, wherein the silicon phase as the main phase includes, as the metals other than silicon and the metals making up silicide, at least one metal selected from the group consisting of Fe, Ca, Al, Ti, and Zr.

According to a fourth aspect of the present invention, the honeycomb structure according to any one of the first to third aspects is provided, wherein the porous body includes an oxide, and the oxide includes at least $SiO_2$.

According to a fifth aspect of the present invention, the honeycomb structure according to the fourth aspect is provided, wherein the porous body includes 1 to 30 mass % of the oxide.

According to a sixth aspect of the present invention, the honeycomb structure according to the fourth or fifth aspects is provided, wherein in a first form of the silicon phase and the oxide present in the porous body, the silicon phase as the main phase includes a plurality of silicon particles, and the oxide is present between the plurality of silicon particles.

According to a seventh aspect of the present invention, the honeycomb structure according to the sixth aspect is provided, wherein the oxide in the first form has a particle diameter of 5 µm or less.

According to an eighth aspect of the present invention, the honeycomb structure according to any one of the fourth to seventh aspects is provided, wherein the oxide includes a first oxide made of MgO, $Al_2O_3$ and $SiO_2$.

According to a ninth aspect of the present invention, the honeycomb structure according to any one of the fourth to eighth aspects is provided, wherein in a second form of the silicon phase and the oxide present in the porous body, the oxide is present at a surface of the silicon phase as the main phase.

According to a tenth aspect of the present invention, the honeycomb structure according to any one of the fourth to ninth aspects is provided, wherein the oxide includes a second oxide made of $SiO_2$.

According to an eleventh aspect of the present invention, the honeycomb structure according to any one of the fourth to tenth aspects is provided, wherein the oxide includes any one or more of cordierite and cristobalite.

According to a twelfth aspect of the present invention, the honeycomb structure according to any one of the first to eleventh aspects is provided, wherein the porous body has standard deviation of a thickness of skeleton that is 2 µm or less.

According to a thirteenth aspect of the present invention, the honeycomb structure according to any one of the first to twelfth aspects is provided, wherein the porous body has an average of a length of skeleton that is 90 µm or more.

According to a fourteenth aspect of the present invention, the honeycomb structure according to any one of the first to thirteenth aspects is provided, wherein the porous body has porosity of 25 to 65%.

According to a fifteenth aspect of the present invention, the honeycomb structure according to any one of the first to fourteenth aspects is provided, wherein the porous body has an average pore diameter of 5 to 40 µm.

According to a sixteenth aspect of the present invention, the honeycomb structure according to any one of the first to fifteenth aspects is provided, further includes a plugging portion at the first end face and the second end face of the honeycomb structure body so as to plug an open end of at least one of the cells.

According to a seventeenth aspect of the present invention, the honeycomb structure according to any one of the first to sixteenth aspects is provided, wherein the honeycomb structure body is formed by a honeycomb segment bonded member including a plurality of honeycomb segments that are bonded while being displaced adjacent to each other so that side faces thereof are opposed.

According to an eighteenth aspect of the present invention, the honeycomb structure according to any one of the first to seventeenth aspects is provided, wherein the honeycomb structure body includes a circumferential wall disposed so as to surround circumference of the honeycomb structure body, and the circumferential wall has a pair of electrode members.

The honeycomb structure of the present invention includes a pillar-shaped honeycomb structure body having a porous partition wall. The honeycomb structure body includes a plurality of cells defined by the partition wall so as to extend from a first end face to a second end face of the honeycomb structure body. The partition wall is formed by a porous body including a silicon phase as a main phase, and the silicon phase as the main phase has content of each of metals other than silicon and metals making up silicide that is 0.3 part by mass or less with respect to 100 parts by mass of silicon. With this configuration, the honeycomb structure of the present invention has an advantageous effect of low heat capacity and high thermal diffusivity and of following the ambient temperature change rapidly. Therefore, when the honeycomb structure of the present invention is used as a DPF, for example, the temperature-rising property during regeneration of the DPF can be improved, and its locally excessive temperature rising can be suppressed. When the honeycomb structure of the present invention is used as a GPF, the temperature-rising property during exhaust gas flow can be improved, and the temperature of the GPF is allowed to rise quickly and uniformly. When the honeycomb structure of the present invention is used as various types of catalyst carriers as well, the temperature-rising property of the catalyst carrier can be improved, and the temperature of the catalyst carrier is allowed to rise quickly and uniformly.

DESCRIPTION OF THE PREFERRED EMBODIMENTS

The following describes embodiments of the present invention in details, with reference to the drawings. The present invention is not limited to the following embodiments, and is to be understood that modifications and improvements of the design may be added as needed based on the ordinary knowledge of a person skilled in the art without departing from the scope of the present invention.

Figure 1:
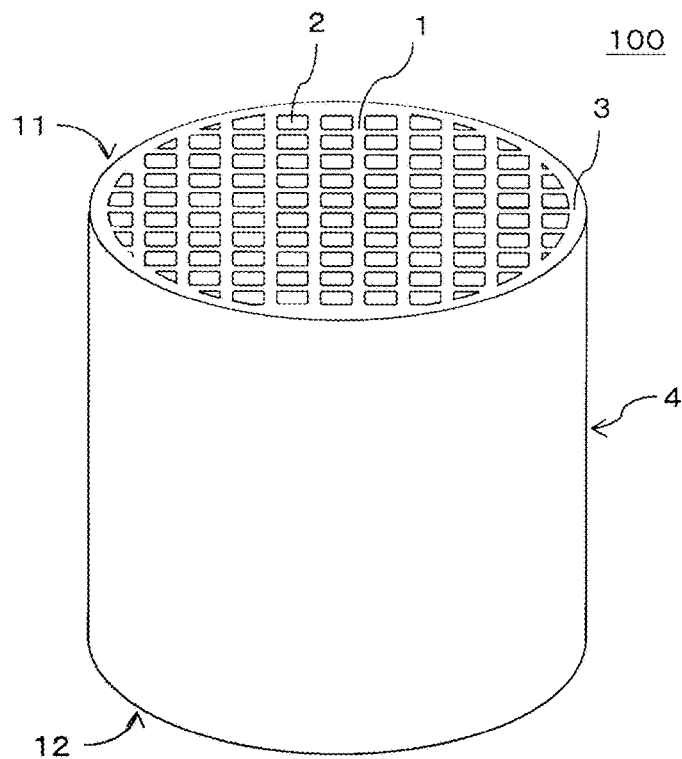
FIG. 1 is a schematic perspective view of one embodiment of a honeycomb structure of the present invention from its inflow-end face.
Figure 2:
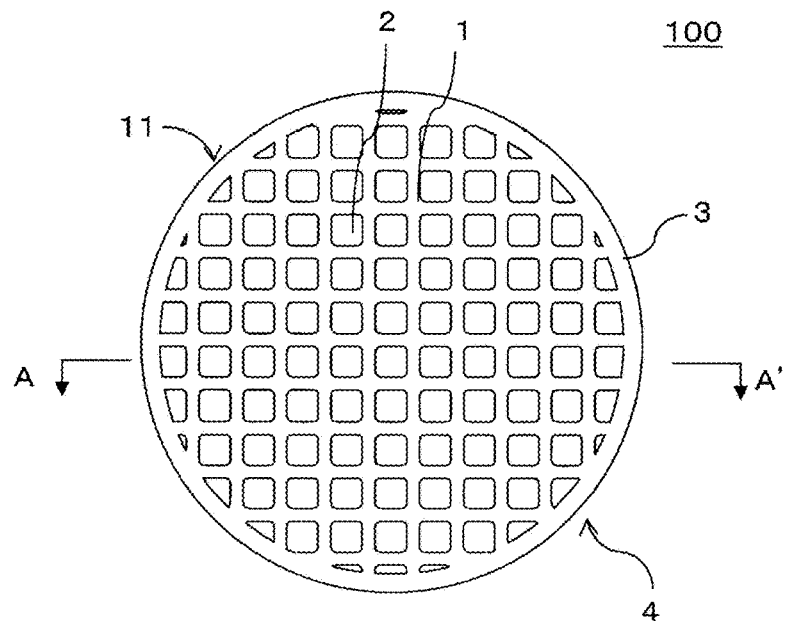
FIG. 2 is a schematic plan view of the honeycomb structure shown in FIG. 1 from the inflow-end face.
Figure 3:
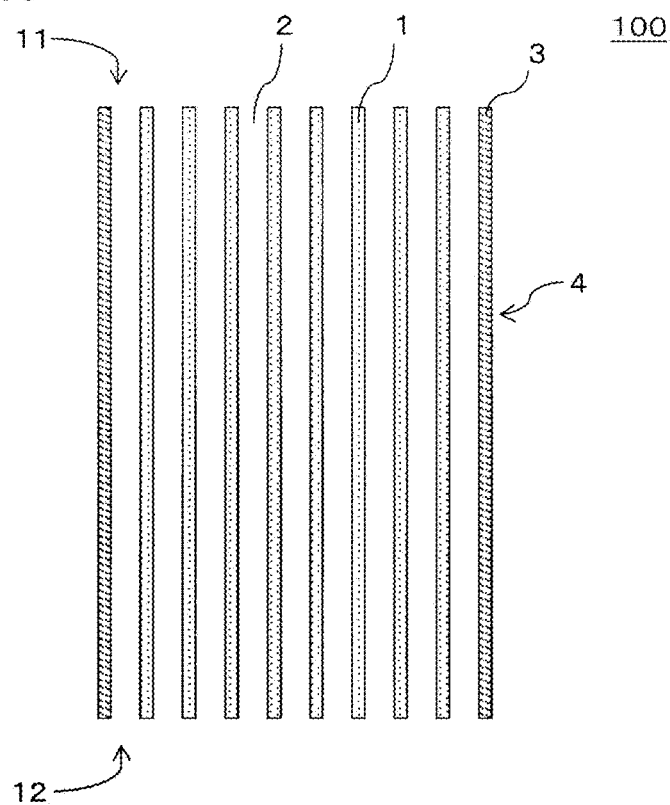
FIG. 3 is a schematic cross sectional view along the line A-A' of FIG. 2.

One embodiment of the honeycomb structure of the present invention is a honeycomb structure 100 including a pillar-shaped honeycomb structure body 4 having a porous partition wall 1 as shown in FIGS. 1 to 3. The honeycomb structure body 4 includes a plurality of cells 2 defined by the partition wall 1 that extend from a first end face 11 to a second end face 12 of the honeycomb structure body 4. The honeycomb structure 100 shown in FIG. 1 to FIG. 3 further includes a circumferential wall 3 located at the outermost circumference of the honeycomb structure body 4.

The partition wall 1 is formed by a porous body including a silicon phase as a main phase. In the honeycomb structure 100 of the present embodiment, the silicon phase included in the porous body as a main phase has a specific composition. That is, the silicon phase included in the porous body as a main phase has the content of each of the metals other than silicon and the metals that make up silicide that is 0.3 part by mass or less with respect to 100 parts by mass of silicon. In the following, such a silicon phase may be called a "specific silicon phase". The partition wall 1 formed by a porous body including such a specific silicon phase as a main phase has high thermal diffusivity at the same porosity and low heat capacity compared with those of conventionally known materials of the partition wall of the honeycomb structure. Therefore the honeycomb structure 100 of the present embodiment has low heat capacity and high thermal diffusivity, and follows the ambient temperature change rapidly. Further the partition wall 1 of the honeycomb structure 100 of the present embodiment is formed by a porous body including a specific silicon phase as a main phase, and so a lighter honeycomb structure can be realized. This means that the honeycomb structure 100 hardly breaks due to vibrations or the like. Since the honeycomb structure 100 is lighter, when it is used as a filter or a catalyst carrier, it is easy to put (perform canning of) the honeycomb structure 100 into a container which accommodates the honeycomb structure 100. Further, since the partition wall 1 of the honeycomb structure 100 of the present embodiment is formed by a porous body including a specific silicon phase as a main phase, it has a small thermal expansion coefficient and high thermal shock resistance compared with a porous body including "a silicon phase other than the specific silicon phase" as a main phase. Note here that a "silicon phase other than the specific silicon phase" refers to a silicon phase having the content of at least one type of metal out of the metals other than silicon and the metals making up silicide that is more than 0.3 part by mass with respect to 100 parts by mass of silicon.

When the honeycomb structure 100 of the present embodiment is used as a DPF, for example, the temperature-rising property during regeneration of the DPF can be improved, and its locally excessive temperature rising can be suppressed. This can reduce the frequency of regeneration of the DPF, and even when a large amount of soot is combusted at one time, the DPF hardly breaks due to thermal shock. When the honeycomb structure 100 is used as a GPF, the temperature-rising property during exhaust gas flow can be improved, and the temperature of the GPF is allowed to rise quickly and uniformly. When the honeycomb structure 100 is used as various types of catalyst carriers as well, the temperature-rising property of the catalyst carrier can be improved, and the temperature of the catalyst carrier is allowed to rise quickly and uniformly. Moreover, since locally excessive temperature rising can be suppressed, deterioration of the catalyst (deterioration due to excessive temperature rising) hardly occurs.

FIG. 1 is a schematic perspective view of one embodiment of the honeycomb structure of the present invention from its inflow-end face. FIG. 2 is a schematic plan view of the honeycomb structure shown in FIG. 1 from the inflow-end face. FIG. 3 is a schematic cross sectional view along the line A-A' of FIG. 2.

The "main phase" in the porous body forming the partition wall 1 refers to a substance of 60 mass % or more in the mass ratio. The "main phase" in the porous body forming the partition wall 1 is preferably a substance of 70 mass % or more, more preferably a substance of 80 mass % or more, and particularly preferably a substance of 90 mass % or more in the mass ratio. In the honeycomb structure 100 of the present embodiment, the "main phase" in the porous body is the "specific silicon phase" described in the above. Herein the porous body preferably includes 70 mass % or more of the specific silicon phase as the main phase, more preferably includes 80 mass % or more as the main phase and particularly preferably includes 90 mass % or more as the main phase.

The specific silicon phase has content of each of the metals other than silicon and the metals that make up silicide that is 0.3 part by mass or less with respect to 100 parts by mass of silicon. The "metals other than silicon" refer to a single body of an element having a eutectic point in the phase diagram of the binary system with silicon. "Silicide" refers to a compound made of a metal and silicon. Hereinafter "the metals other than silicon and the metals that make up silicide" may be called a "specific impurity". Note here that the metals that make up silicide do not include silicon. In the present specification, a "silicon phase" refers to a phase including silicon and impurities mixed with silicon. "Silicon" refers to a substance (single body) made of Si elements. It was confirmed that the content of each of the specific impurities is 0.3 part by mass or less in the specific silicon phase, whereby standard deviation of the thickness of skeleton of the porous body decreases, and the average of the length of skeleton of the porous body increases. Then, it was found that such a decrease in standard deviation of the thickness of skeleton of the porous body and an increase in average of the length of skeleton of the porous body can greatly contribute to the improvement of thermal diffusivity of the porous body. Hereinafter, the structure of skeleton of a porous body, such as the thickness of skeleton and the length of skeleton of the porous body, may be collectively called a "microstructure of the porous body".

The specific silicon phase has content of each of the specific impurities that is preferably 0.3 part by mass or less with respect to 100 parts by mass of silicon, and more preferably 0.1 part by mass or less. A decrease in the content of specific impurities means a more suitable microstructure of the porous body to improve the thermal diffusivity.

When the specific silicon phase contains a plurality of specific impurities, the total content of the specific impurities is preferably 0.8 part by mass or less with respect to 100 parts by mass of silicon, more preferably 0.5 part by mass or less, and particularly preferably 0.3 part by mass or less.

Herein, the content of the specific impurities in the silicon phase can be measured by the following method. Firstly, a test piece of a required amount for measurement is cut out from the porous body forming the partition wall of the honeycomb structure, and the cut-out test piece is pulverized into powder. Then, the diffraction pattern of the obtained powder is measured using an X-ray diffractometer (XRD). Thereafter the crystalline phase contained in the porous body is identified based on the measured diffraction pattern. Then the amount of each crystalline phase is determined for the identified crystalline phase by a Reference Intensity Ratio (RIR) method. Next, among the crystalline phases identified from the diffraction pattern, the content (mass %) of the specific impurity contained in the crystalline phase including the specific impurity is obtained, and the ratio (part by mass) of the specific impurity with respect to 100 parts by mass of silicon is calculated. Note here that, when the specific impurity is a single metal body, the content of the single metal body in the silicon phase is found. When the specific impurity is a metal making up a compound (silicide) of the metal and silicon, then the content of the metal included in the compound (silicide) with silicon is obtained using the "content of the metal contained in the crystalline phase including the specific impurity" determined from the diffraction pattern. In this way, the content of the specific impurity in the silicon phase can be obtained.

The specific impurity (metals other than silicon and metals that make up silicide) may be at least one metal selected from the group consisting of Fe, Ca, Al, Ti, and Zr. Among the metals included in the group, Fe, Ca and Al are major impurities included in metallic silicon. The specific silicon phase in the state of metal or silicide may contain at least one metal selected from the aforementioned group. Herein, the content of each of the metals included in the state of metal or silicide is 0.3 part by mass or less with respect to 100 parts by mass of silicon. The content of each of all of the metals included in the group (including metals that make up silicide) is 0.3 part by mass or less with respect to 100 parts by mass of silicon, whereby the microstructure of the porous body is improved, and thermal diffusivity of the porous body is improved.

The porous body may include an oxide in addition to the specific silicon phase. As the oxide, at least $SiO_2$ is included preferably. Such a porous body including an oxide can lead to improvement of thermal diffusivity, strength and heat resistance of the porous body. The amount of an oxide included in the porous body is preferably 30 mass % or less, more preferably 1 to 30 mass %, and particularly preferably 1 to 20 mass %. If the amount of an oxide included in the porous body exceeds 30 mass %, thermal diffusivity of the porous body deteriorates, or heat capacity thereof increases. On the contrary, if the amount of an oxide included in the porous body is too small, e.g., less than 1 mass %, then the effect to improve thermal diffusivity, strength and heat resistance cannot be exerted sufficiently.

The content of an oxide in the porous body can be measured by the following method. Firstly, a test piece of a required amount for measurement is cut out from the porous body forming the partition wall of the honeycomb structure, and the cut-out test piece is pulverized into powder. Then, the obtained powder is immersed in hydrofluoric acid so as to elute the oxide included in the porous body into the hydrofluoric acid. The amount (mass %) of the oxide included in the porous body can be obtained from a difference between the mass of the powder before elution and the mass of the powder as residue. Herein, the powder as residue refers to the powder that is collected after elution of the oxide into the hydrofluoric acid and then is dried. According to this method, the total mass of the crystalline oxide included in the porous body and the amorphous oxide (glasslike oxide) can be determined. The mass of the oxide included in the porous body is used to calculate the mass ratio of the silicon phase in the porous body described below.

Next, the following describes a method to calculate the mass ratio of the silicon phase in the porous body. When the mass ratio of the silicon phase in the porous body is calculated, the mass of the oxide included in the porous body is firstly obtained in accordance with the method to measure the content of the oxide in the porous body as stated above. Next, the resultant of subtraction of the mass of the oxide from the total mass of the porous body is the mass of the silicon phase. That is, the mass of the power as residue in the measurement method of the content of the oxide is the mass of the silicon phase. Then, the content of silicon included in the silicon phase is calculated using the mass of the silicon phase, and the mass ratio of silicon as the crystalline part and the metals other than silicon and the metals that make up silicide in the porous body, which is known from the measurement of the content of the specific impurities.

The oxide is preferably included in the porous body as in the following form. Firstly in a first form of the silicon phase and the oxide existing in the porous body, the silicon phase as the main phase includes a plurality of silicon particles, and the oxide exists between the plurality of silicon particles. Hereinafter the oxide existing between the plurality of silicon particles in the first form may be called a "first-form oxide". With this configuration, the "microstructure of the porous body" suitable to improve thermal diffusivity can be kept, and the porous body can have low porosity. Therefore, the honeycomb structure can have improved thermal diffusivity and strength. In the first mode, the oxide in the form other than the first form may exist at a part other than between the plurality of silicon particles.

The oxide preferably includes a first oxide made of MgO, $Al_2O_3$, and $SiO_2$. Then, the first-form oxide is preferably such a first oxide. When the first-form oxide is the first oxide, the effect to lower the porosity of the porous body can be exerted more. An example of the first oxide includes cordierite.

The oxide in the first form may have a particle diameter of 5 μm or less preferably, 0.5 to 5 μm more preferably and 1 to 4 μm particularly preferably. If the particle diameter of the first-form oxide is larger than 5 μm, thermal diffusivity of the porous body may deteriorate or the microstructure of the porous body may become non-uniform (in other words, standard deviation of the thickness of skeleton increases).

The existence of an oxide in the first form (i.e., the existence of the first-form oxide) can be checked as follows. Firstly, a test piece of a required size for measurement is cut out from the porous body forming the partition wall of the honeycomb structure. Next, the cutting plane of the obtained test piece is embedded in resin. Thereafter, the cutting plane of the test piece is ground, and such a cutting plane is observed by a scanning electron microscope (hereinafter this may be called a "SEM"). When specific particles assumed as the oxide are found between the plurality of silicon particles in this observation, the element making up the specific particles is specified using an energy dispersive X-ray analyzer (EDS). When the particles existing between the plurality of silicon particles are oxide, these particles are the first-form oxide. The first-form oxide may be identified by the method described in the above.

The particle diameter of the first-form oxide can be calculated from a SEM image (reflecting electron image) obtained by a SEM observation of the cutting plane of the test piece as stated above using image analysis software. An example of the image analysis software includes "Image-Pro Plus 7.0J" (product name) produced by Media Cybernetics Inc. Specifically the particle diameter of the oxide existing between a plurality of silicon particles is measured at 20 points selected at random in the aforementioned SEM image. For the particle diameter of each oxide, the maximum size of their particles is measured. Then, the average of the particle diameters measured is used as the particle diameter of the first-form oxide.

Next, in a second form of the silicon phase and the oxide existing in the porous body, the oxide exists at the surface of the silicon phase as the main phase. Hereinafter the oxide existing at the surface of the silicon phase as the main phase in the second form may be called a "second-form oxide". With this configuration, the porous body can have improved heat resistance. Note here that, if the amount of the second-form oxide is too much, the thermal expansion coefficient of the porous body may increase and the thermal shock resistance may deteriorate.

The oxide preferably includes a second oxide made of $SiO_2$. Then, the second-form oxide is preferably such a second oxide. An example of the second oxide as the second-form oxide is an oxide that is oxidized silicon existing at the surface of the silicon phase out of silicon included in the silicon phase as the main phase. With this configuration, the porous body can have more improved heat resistance.

The existence of an oxide in the second form (i.e., the existence of the second-form oxide) can be checked as follows. Firstly, a test piece of a required size for measurement is cut out from the porous body forming the partition wall of the honeycomb structure. Next, the fracture plane of the obtained test piece is observed using a SEM. Herein, the fracture plane is a plane appearing when a test piece breaks. When a substance assumed as the second-form oxide is found at the surface of the silicon phase in this observation, the element thereof is specified using an energy dispersive X-ray analyzer (EDS). When the substance existing at the surface of the silicon phase is an oxide, this substance is the oxide in the second form. The component of the oxide in the second form can be identified by the method described in the above. For instance, when Si and O are detected at the surface of the silicon phase and when Si only is detected inside of the silicon phase, the second oxide exists at the surface of the silicon phase. That is, the oxide in the second form is the second oxide.

The oxide included in the porous body preferably includes any one or more of cordierite and cristobalite. The first oxide as stated above includes cordierite particularly preferably. The second oxide as stated above includes cristobalite particularly preferably.

The porous body forming the partition wall may include aggregate, such as silicon carbide, silicon nitride, mullite, or corundum. When the porous body includes such aggregate, the mass of the aggregate with respect to the mass of the porous body is preferably 20 mass % or less, 10 mass % or less more preferably and 1 mass % or less particularly preferably. When the porous body includes such aggregate, heat capacity of the porous body may increase and temperature-rising property of the honeycomb structure may deteriorate, or thermal diffusivity may decrease. The content of the aggregate in the porous body is determined using a diffraction pattern obtained when the content of specific impurities in the silicon phase is measured.

The porous body has a three-dimensional network structure, in which a plurality of pores is formed. In the honeycomb structure of the present embodiment, standard deviation of the thickness of skeleton of the porous body is preferably 2 μm or less. Standard deviation of the thickness of skeleton of the porous body is an index of variations in the size of the silicon phase. Accordingly, small standard deviation of the thickness of skeleton means decrease in bottle-neck portions on the heat conduction path, and so high thermal diffusivity can be achieved. Further small standard deviation of the thickness of skeleton means a decrease in coarse pores relatively, and so strength of the honeycomb structure can be improved. When such a honeycomb structure is used as a filter, the trapping performance of the filter can be improved. The standard deviation of the thickness of skeleton of the porous body is 1 μm or less more preferably and 0.5 μm or less particularly preferably. The practical lower limit of the standard deviation of the thickness of skeleton of the porous body is 0.3 μm.

Figure 4A:
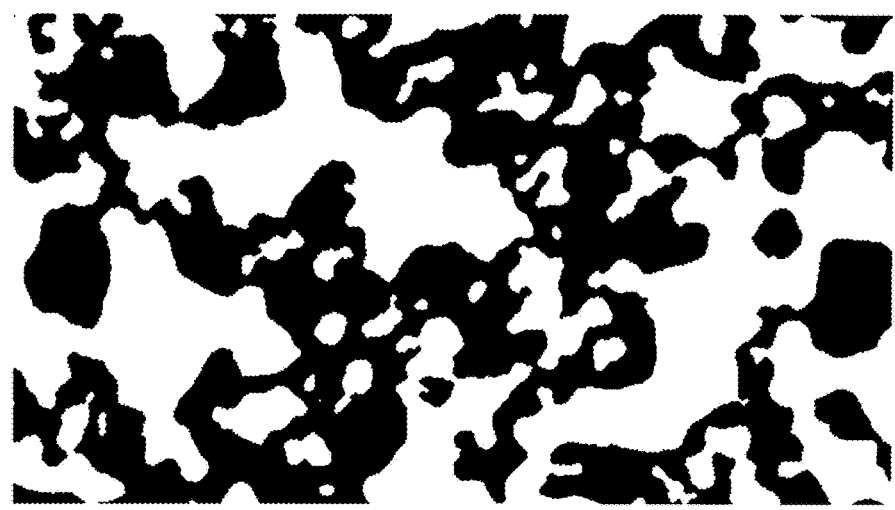
FIG. 4A is a photo after binarization by image processing of a photo taken of the reflecting electron image of the honeycomb structure of the present invention using a scanning electron microscope.
Figure 4B:
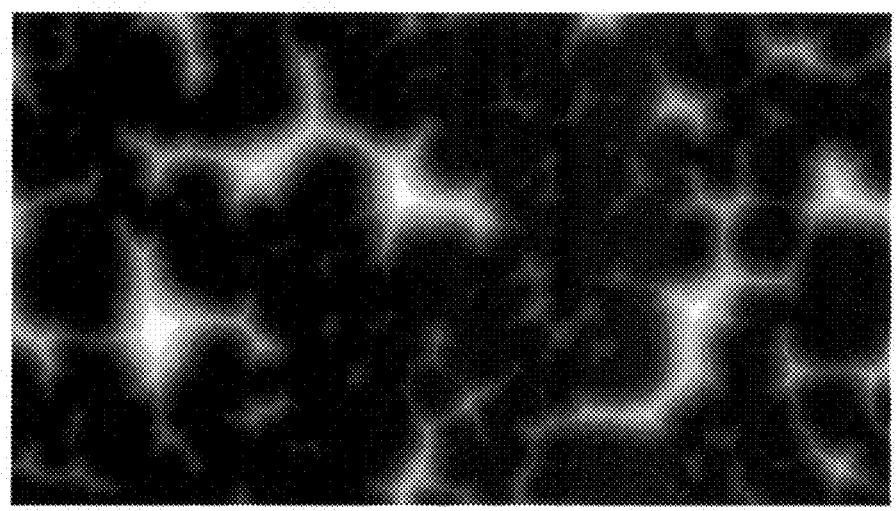
FIG. 4B is a photo obtained by further performing image processing of the image of FIG. 4A so as to represent the distance from the circumferential part of each silicon phase with the contrasting density of each pixel.

The standard deviation of the thickness of skeleton of the porous body can be obtained as follows. Firstly, a test piece of a required size for measurement is cut out from the porous body forming the partition wall of the honeycomb structure. Next, the cutting plane of the obtained test piece is embedded in resin. Thereafter, the cutting plane of the test piece is ground, and such a cutting plane is observed by a SEM to take a reflecting electron image at 200-fold magnification. The rectangular range of 300 μm×600 μm at the partition wall part of the obtained image is analyzed using image analysis software to calculate standard deviation of the thickness of skeleton. Specifically as shown in FIG. 4A, a binarized image is created by binarizing the obtained SEM image to a part corresponding to the silicon phase as the main phase and a part other than that. Next as shown in FIG. 4B, a distance map is created for the part corresponding to each silicon phase in the binarized image. Specifically, an image is created, representing a distance from the circumferential part (outline part) of each silicon phase with the contrasting density of each pixel. The distance map is obtained by representing the image after binarization in the 16-bit gray scale form. In the distance map, the density of each pixel indicating the substantive part of each silicon phase represents the distance from the pixel to the circumferential part. Next, average density at each silicon phase is obtained using the obtained image, and the average density is used as the thickness of skeleton of each silicon phase. Then, standard deviation of the thicknesses of skeleton for the silicon phases is obtained, which is used as the standard deviation of the thickness of skeleton of the porous body. An example of the image analysis software includes "Image-Pro Plus 7.0J" (product name) produced by Media Cybernetics Inc.

Figure 4C:
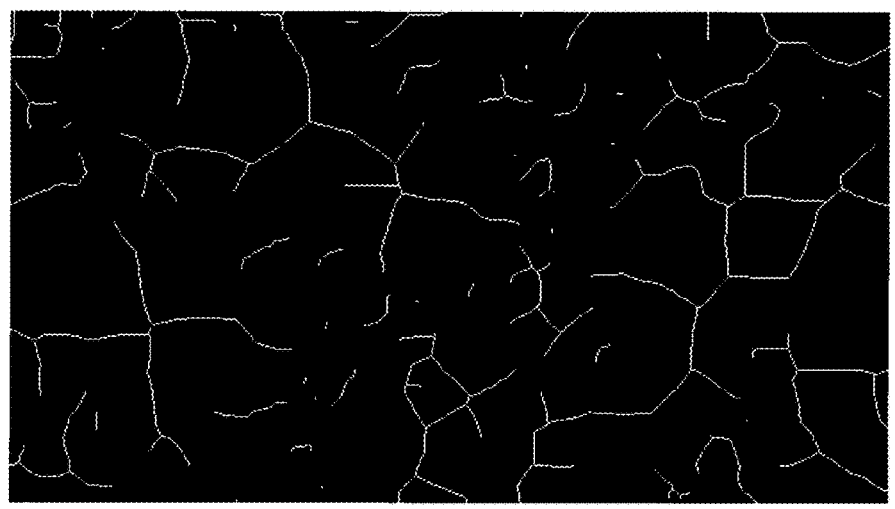
FIG. 4C is a photo obtained by performing thinning processing by image processing of the image of FIG. 4A to show an image after extraction of the skeleton of each silicon phase.

Herein FIG. 4A is a photo after binarization by image processing of a photo taken of the reflecting electron image of the honeycomb structure of the present invention using a scanning electron microscope. FIG. 4B is a photo obtained by further performing image processing of the image of FIG. 4A so as to represent the distance from the circumferential part of each silicon phase with the contrasting density of each pixel. FIG. 4C is a photo obtained by performing thinning processing by image processing of the image of FIG. 4A to show an image after extraction of the skeleton of each silicon phase.

In the honeycomb structure of the present embodiment, the length of skeleton of the porous body preferably has average that is 90 μm or more. The average of the length of skeleton of the porous body is an index of the degree of connecting between silicon phases. That is, large average of the length of skeleton of the porous body means that the heat conduction path is hardly divided, and so high thermal diffusivity can be achieved. Large average of the length of skeleton of the porous body further means an increase in part of the silicon phases coupled, and so strength of the honeycomb structure can be improved. The average of the length of skeleton of the porous body is 120 μm or more preferably, and 300 μm or more particularly preferably. The practical upper limit of the length of skeleton of the porous body is 500 μm.

The average of the length of skeleton of the porous body can be obtained as follows. Firstly a binarized image is created similarly to the method to obtain the standard deviation of the thickness of skeleton of the porous body. Next as shown in FIG. 4C, the center line of each silicon phase is extracted by thinning processing, and each center line is used as the skeleton of the corresponding silicon phase. The thinning processing is to trim each silicon phase from the circumferential part bit by bit to obtain the line of one pixel finally. Next, the overall length of the center line of one silicon phase is used as the length of skeleton of the one silicon phase. Then the average of the lengths of skeleton of the silicon phases is used as the average of the length of skeleton of the porous body.

The porous body has porosity of 25 to 65% preferably, 30 to 50% more preferably and 35 to 45% particularly preferably. If the porosity of the porous body is less than 25%, pressure loss may increase when the honeycomb structure is used as a filter. If the porosity of the porous body exceeds 65%, the partition wall of the honeycomb structure becomes brittle and may easily fall. The porosity of the porous body is the porosity of the partition wall of the honeycomb structure. The porosity of the porous body can be measured by the Archimedes's method, in accordance with JIS R 1634.

The porous body preferably has the average pore diameter of 5 to 40 μm, 5 to 20 μm more preferably and 5 to 15 μm particularly preferably. If the average pore diameter of the porous body is less than 5 μm, pressure loss may increase when the honeycomb structure is used as a filter. If the average pore diameter of the porous body exceeds 40 μm, a part of PM in exhaust gas may pass through the partition wall when the honeycomb structure is used as a filter, and so trapping efficiency of the filter may deteriorate. The average pore diameter of the porous body can be measured by a mercury intrusion technique in accordance with JIS R 1655.

The thickness of the partition wall of the honeycomb structure body is not limited especially, which may be 100 to 500 μm preferably, 150 to 400 μm more preferably and 150 to 300 μm particularly preferably. Such a range of the partition wall thickness allows the strength of the partition wall of the honeycomb structure to be kept and enables suppression of an increase in pressure loss.

The cell density of the honeycomb structure body is not limited especially, which may be 15 to 100 cells/cm$^2$ preferably, 30 to 65 cells/cm$^2$ more preferably, and 30 to 50 cells/cm$^2$ particularly preferably. Such a range of the cell density enables suppression of an increase in pressure loss while improving the trapping efficiency when the honeycomb structure is used as a filter.

The cell shape formed at the honeycomb structure body is not limited especially. Herein, "the cell shape" refers to a shape of the cells at a cross section of the honeycomb structure body orthogonal to the cell extending direction. Examples of the cell shape include a quadrangle, a hexagon, an octagon and the combination thereof.

The shape of the honeycomb structure body is not limited especially, which may be a pillar-shaped having a circular bottom face (round pillar-shaped), a pillar-shaped having an oval bottom face, a pillar-shaped having a polygonal (quadrangle, pentagon, hexagon, heptagon, octagon and the like) bottom face, and the like.

The length from a first end face to a second end face of the honeycomb structure body and the size of the cross section of the honeycomb structure body orthogonal to the cell extending direction may be selected appropriately depending on the operating state and the operating purpose of the honeycomb structure of the present embodiment. For instance, the length from a first end face to a second end face of the honeycomb structure body is preferably 100 to 500 mm, and 100 to 300 mm more preferably. The area of the cross section of the honeycomb structure body orthogonal to the cell extending direction is 7,000 to 70,000 mm$^2$ preferably and 7,000 to 30,000 mm$^2$ more preferably.

Catalyst for exhaust gas purification may be loaded at least one of the surface of the partition wall and the pores of the partition wall of the honeycomb structure body. An example of the catalyst include porous γ-Al$_2$O$_3$ loaded with platinum group metal. Herein since the catalyst loaded at the partition wall of the honeycomb structure body is an element different from the partition wall (in other words, porous body), "the material making up the porous body" does not include the catalyst.

Figure 5:
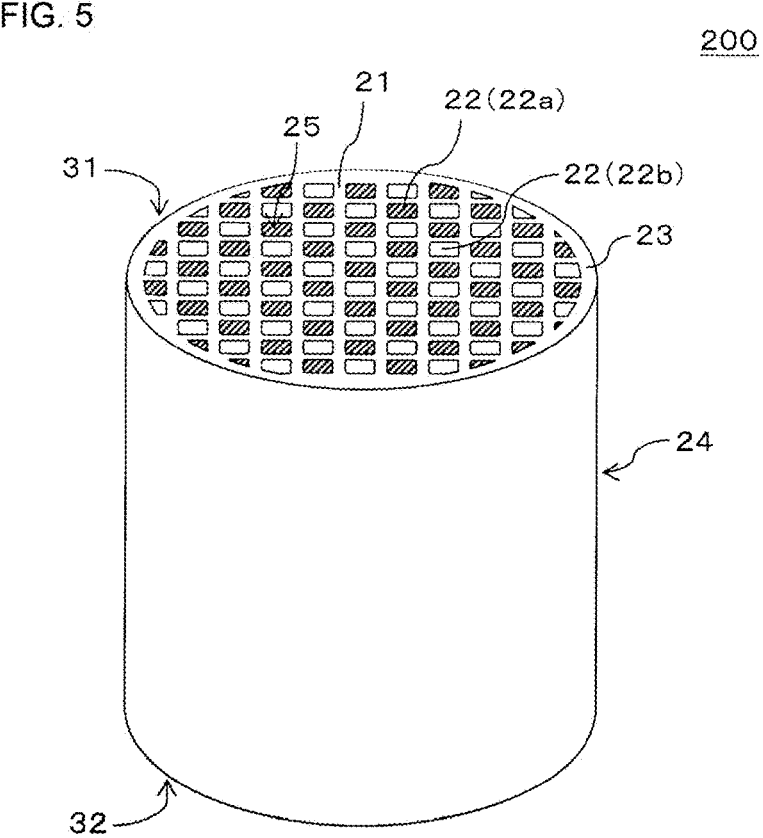
FIG. 5 is a schematic perspective view of another embodiment of the honeycomb structure of the present invention from its inflow-end face.
Figure 6:
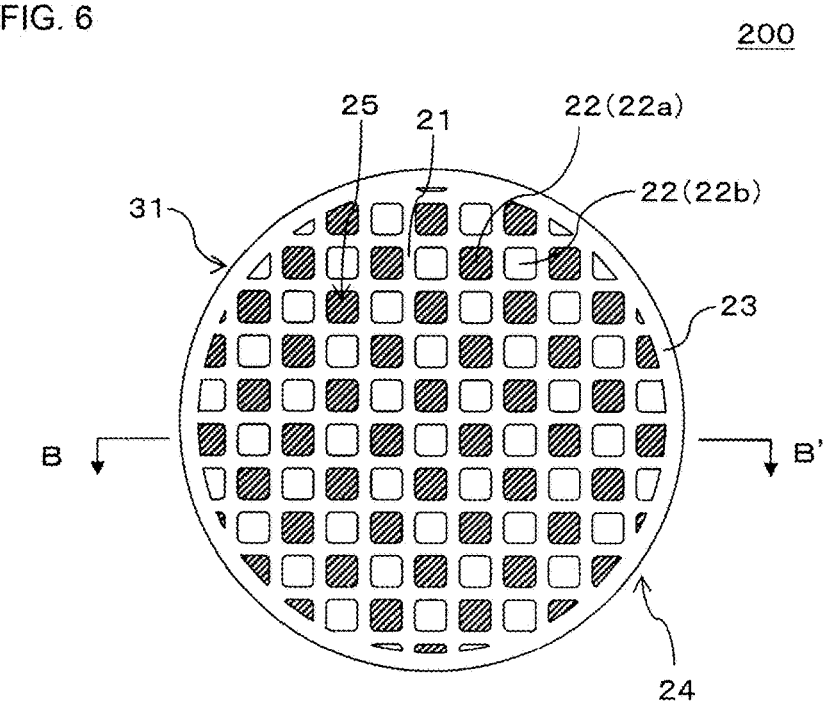
FIG. 6 is a schematic plan view of the honeycomb structure shown in FIG. 5 from the inflow-end face.
Figure 7:
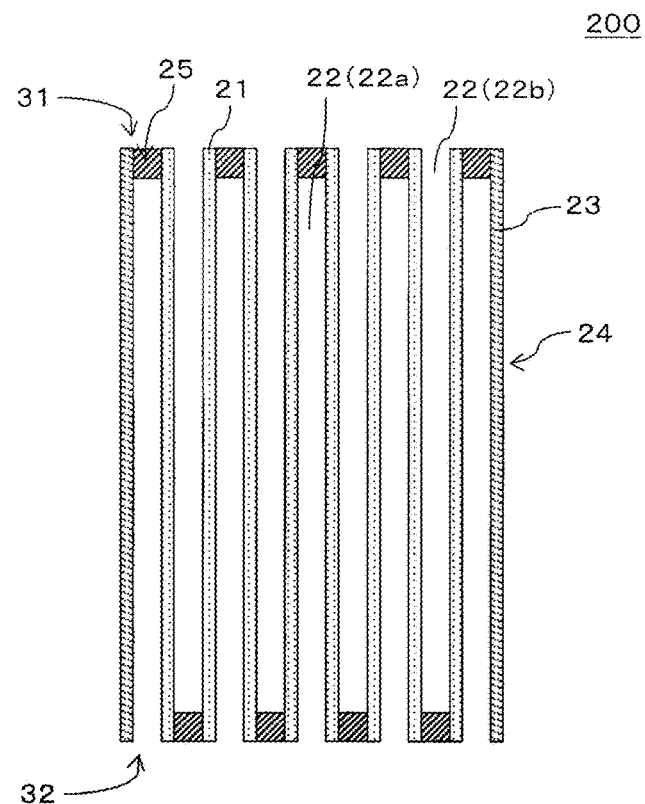
FIG. 7 is a schematic cross sectional view along the line B-B' of FIG. 6.

Next, the following describes another embodiment of the honeycomb structure of the present invention. The honeycomb structure of the present embodiment is a honeycomb structure 200 as shown in FIGS. 5 to 7. The honeycomb structure 200 includes a pillar-shaped honeycomb structure body 24 having a porous partition wall 21 and a plugging to plug the open ends of cells 22. The honeycomb structure body 24 includes the plurality of cells 22 defined by the partition wall 21 so as to extend from a first end face 31 to a second end face 32 of the honeycomb structure body 24. The plugging portion 25 is disposed at the first end face 31 and the second end face 32 of the honeycomb structure body 24 so as to plug the open end of at least one of the cells 22. In FIGS. 5 to 7, the plugging portion 25 is provided at the open ends of predetermined cells 22a (hereinafter simply called "cells 22a" as well) at the first end face 31 and at the open ends of residual cells 22b (hereinafter simply called "cells 22b" as well) at the second end face 32. The thus configured honeycomb structure 200 can be used as a particulate filter to purify exhaust gas emitted from an internal combustion engine or various types of combustion devices. The honeycomb structure 200 shown in FIGS. 5 to 7 further has a circumferential wall 23 located at the outermost circumference of the honeycomb structure body 24.

FIG. 5 is a schematic perspective view of another embodiment of the honeycomb structure of the present invention from its inflow-end face. FIG. 6 is a schematic plan view of the honeycomb structure shown in FIG. 5 from the inflow-end face. FIG. 7 is a schematic cross sectional view along the line B-B' of FIG. 6.

Figure 8:
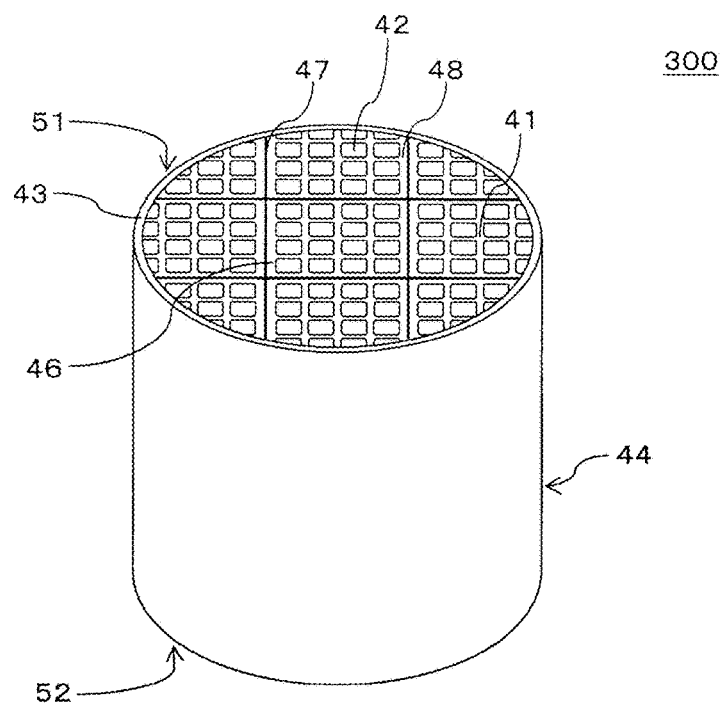
FIG. 8 is a schematic perspective view of still another embodiment of the honeycomb structure of the present invention from its inflow-end face.

Next, the following describes still another embodiment of the honeycomb structure of the present invention. The honeycomb structure of the present embodiment is a honeycomb structure 300 as shown in FIG. 8. The honeycomb structure 300 shown in FIG. 8 includes a segmented structured honeycomb structure body 44. That is, the honeycomb structure body 44 is formed by a honeycomb segment bonded member including a plurality of honeycomb segments 46. Each honeycomb segment 46 is a pillar-shaped having a partition wall 41, and the plurality of honeycomb segments 46 are bonded while being displaced adjacent to each other so that their side faces are opposed. Each honeycomb segment 46 includes the porous partition wall 41 defining a plurality of cells 42 extending from a first end face 51 to a second end face 52 and serving as a through channel of fluid, and an outer wall 48 disposed to surround the partition wall 41. A bonding layer 47 is to bond the outer walls 48 of the honeycomb segments 46 disposed adjacently. This bonding layer 47 may have a function as a buffer for thermal stress generated at the honeycomb structure body 44. The honeycomb structure 300 shown in FIG. 8 includes a circumferential wall 43 at the outermost circumference of the bonded member in which the plurality of honeycomb segments 46 are bonded. Hereinafter, a honeycomb structure body formed by a honeycomb segment bonded member may be called a "segmented structured honeycomb structure body". Herein, FIG. 8 is a schematic perspective view of still another embodiment of the honeycomb structure of the present invention from its inflow-end face.

In the segmented structured honeycomb structure body, the partition wall of at least one honeycomb segment among the plurality of honeycomb segments preferably is formed by a porous body including a silicon phase as a main phase. In the segmented structured honeycomb structure body, the partition walls of all of the honeycomb segments may be formed by a porous body including a silicon phase as a main phase. The bonding layer may have a structure similar to that of a bonding layer at the honeycomb structure body of a conventionally known segmented structured honeycomb structure body.

The honeycomb structure 300 as shown in FIG. 8 may be prepared by obtaining a bonded member in which a plurality of honeycomb segments 46 are bonded and by processing the circumference of the obtained bonded member by grinding or the like. Such processing of the circumferential part of the bonded member allows the shape of the cross section orthogonal to the extending direction of the cells 42 of the bonded member to be a desired shape, such as a circle. After processing of the circumferential part of the bonded member, a ceramic material may be applied at the outermost circumference, whereby a circumferential wall 43 may be disposed. Such a honeycomb structure 300 including a segmented structured honeycomb structure body may further include a plugging portion (not shown) to plug the open ends of the cells 42.

Figure 9:
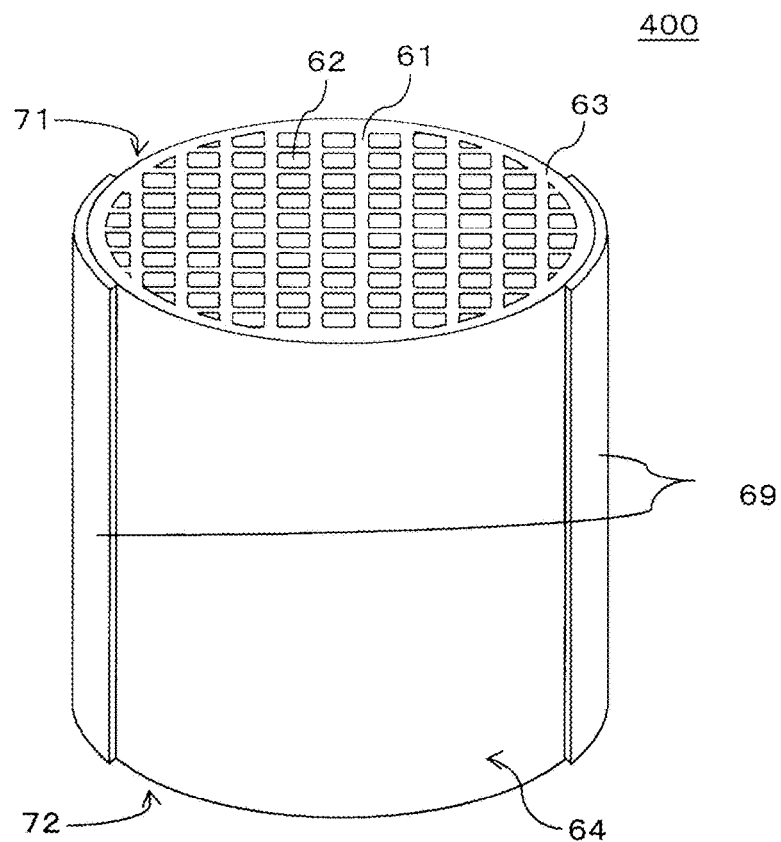
FIG. 9 is a schematic perspective view of a further embodiment of the honeycomb structure of the present invention from its inflow-end face.

Next, the following describes a further embodiment of the honeycomb structure of the present invention. The honeycomb structure of the present embodiment is a honeycomb structure 400 as shown in FIG. 9. In the honeycomb structure 400 shown in FIG. 9, a honeycomb structure body 64 includes a circumferential wall 63 disposed to surround the circumference of the honeycomb structure body 64, and this circumferential wall 63 has a pair of electrode members 69, 69. The honeycomb structure 400 of the present embodiment is configured to produce heat at the honeycomb structure body 64 using heating by energization of the honeycomb structure body 64. That is, it is configured so that when voltage is applied between the pair of electrode members 69, 69, a partition wall 61 formed by a porous body including a silicon phase as a main phase produces heat. As shown in FIG. 9, the honeycomb structure body 64 includes the partition wall 61 that defines a plurality of cells 62 so as to extend from a first end face 71 to a second end face 72 of the honeycomb structure body 44. Herein, FIG. 9 is a schematic perspective view of a further embodiment of the honeycomb structure of the present invention from its inflow-end face.

Each of the pair of electrode members 69, 69 is formed like a belt extending in the extending direction of the cells 62 of the honeycomb structure body 64. Further, the pair of electrode members 69, 69 is preferably disposed so that one of the electrode members 69 is disposed on the opposite side of the center of the honeycomb structure body 64 with reference to the other electrode member 69 at the cross section orthogonal to the extending direction of the cells 62 of the honeycomb structure body 64. With this configuration, the honeycomb structure body 64 can produce heat uniformly.

Examples of the material of the pair of electrode members 69, 69 include an intermetallic compound, such as silicon, silicon carbide or silicide. The pair of electrode members 69, 69 may be formed by applying such a material to the circumferential wall 63 disposed so as to surround the circumference of the honeycomb structure body 64. A part of the circumferential wall 63 may be made of the aforementioned material.

Next the following describes a method for manufacturing a honeycomb structure of the present embodiment. When the honeycomb structure is manufactured, firstly a forming raw material is prepared, which is to prepare a porous body including a specific silicon phase as a main phase. The forming raw material is not limited especially as long as a fired body (porous body) obtained by firing the forming raw material includes a specific silicon phase as stated above as a main phase. For instance, the forming raw material is preferably a silicon raw material in which the content of each of the metals other than silicon and the metals that can be contained as silicide (they may form silicide already) is 0.3 part by mass or less with respect to 100 parts by mass of silicon at the stage of such a raw material. Note here that when metal contamination is expected during manufacturing, a high purity silicon raw material with less content of specific impurities is preferably used.

The forming raw material may additionally include a composite oxide made of MgO, $Al_2O_3$, and $SiO_2$. Herein the blending amount of the composite oxide is adjusted so that a specific silicon phase is included as a main phase in the resultant fired body. The forming raw material may further include dispersing medium and additives in addition to the raw material as stated above.

Examples of the additives include binder, surfactant and pore former. Examples of the dispersing medium include water.

Examples of the binder include methylcellulose, hydroxypropoxyl cellulose, hydroxyethylcellulose, carboxymethylcellulose, and polyvinyl alcohol. Examples of the surfactant include ethylene glycol, fatty acid soap, and polyalcohol. Examples of the pore former, which are not especially limited as long as it forms pores after firing, include starch, foamable resin, water absorbable resin and silica gel.

The particle diameter and the blending amount of the raw material powder as stated above as well as the particle diameter and the blending amount of the pore former powder to be added are adjusted, whereby a porous body with desired porosity and average pore diameter can be obtained.

Next, the thus obtained forming raw material is kneaded to be a kneaded material. A method for forming a kneaded material is not limited especially. For instance, it may be formed using a kneader, a vacuum pugmill or the like.

Next, the obtained kneaded material is extruded, whereby a honeycomb formed body is prepared. Extrusion can be performed using a die having a desired cell shape, partition wall thickness and cell density. Next, the obtained honeycomb formed body may be dried to obtain a honeycomb dried body that is the dried honeycomb formed body. The drying method is not limited especially. For instance, examples thereof include hot air drying, microwave drying, dielectric drying, reduced-pressure drying, vacuum drying, and freeze-drying. Among them, dielectric drying, microwave drying or hot air drying is preferably performed alone or in combination. Preferable drying conditions are drying temperature at 30 to 150° C. and a drying time of 1 minute to 2 hours. In the present specification, the drying temperature refers to the temperature of atmosphere for drying.

Next, when the honeycomb structure including a plugging portion is to be manufactured, the open ends of the cells of the obtained honeycomb formed body or the honeycomb dried body that is the dried honeycomb formed body are plugged with a plugging material. Examples of the method for plugging the open ends of cells include a method to fill the open ends of cells with the plugging material. The method for filling with the plugging material can be performed in accordance with a conventionally known method for manufacturing a honeycomb structure including a plugging portion. For a raw material to form such a plugging portion, a raw material to form a plugging portion used in a conventionally known method for manufacturing a honeycomb structure can be used. Note here that the raw material used is preferably the same raw material as that of the honeycomb formed body (or the honeycomb dried body). In order to adjust the porosity, the pore diameter or the like of the plugging portion formed by the raw material to form the plugging portion, the particle diameter and the blending amount of the raw material to form the plugging portion as well as the particle diameter and the blending amount of the pore former powder to be added may be changed as needed.

Next, the honeycomb formed body (or the honeycomb dried body) is fired. The obtained honeycomb fired body is the honeycomb structure of the present embodiment. The firing temperature is preferably 1,300 to 1,400° C. In the present specification, the firing temperature refers to the temperature of atmosphere for firing (e.g., the temperature in the firing oven). The firing duration is preferably about 1 to 100 hours. Firing may be performed in a vacuum or in the argon atmosphere, for example.

The obtained honeycomb fired body may be heat treated in the oxidant atmosphere (e.g., in the air). Such a heat treatment forms an oxide of $SiO_2$ at the surface of the silicon phase as the main phase in the porous body.

Alternatively, prior to form the plugging portion at the honeycomb formed body, the honeycomb formed body may be fired to obtain a honeycomb fired body, and a plugging portion may be formed at the open ends of cells of the obtained honeycomb fired body, followed by firing, whereby a honeycomb structure may be obtained. In this way, the honeycomb structure of the present embodiment can be manufactured. Note here that the method for manufacturing a honeycomb structure is not limited to the method as stated above, which may be changed as needed. For instance, when a honeycomb structure including a segmented structured honeycomb structure body is to be manufactured, a forming raw material is prepared by the method as stated above, and a kneaded material obtained by kneading the forming raw material may be used to form a formed body of each honeycomb segment. A method for bonding the honeycomb segments to form a honeycomb segment bonded body may be performed in accordance with a conventionally known manufacturing method.

EXAMPLES

The following describes the present invention in more details by way of examples, and the present invention is not limited to the following examples.

In the following examples and comparative examples, two types of silicon raw material powder shown in Table 1 were used as the silicon raw material powder for the forming raw material. Table 1 shows the composition (mass %) of the silicon raw material powder. One silicon raw material powder of the two types of silicon raw material powder is relatively high purity silicon raw material powder indicated in the field "A" of Table 1. The other silicon raw material powder is relatively low purity silicon raw material powder indicated in the field "B" of Table 1. Hereinafter, the silicon raw material powder indicated in the field "A" of Table 1 may be called "silicon raw material powder A". The silicon raw material powder indicated in the field "B" of Table 1 may be called "silicon raw material powder B". In Table 1, Si, Al, Fe, Ti, Ca, Zr, Mg, K, Na, V, Cr, Mn, Ni, Mo, B and P in the silicon raw material powder are indicated as the composition (mass %) of silicon raw material powder A and silicon raw material powder B. The composition of silicon raw material powder A and silicon raw material powder B was identified and the amount thereof was determined by a fluorescence X-ray FP technique.

In the field of "eutectic point (° C.)" in Table 1 indicates the eutectic point of each element shown in Table 1 and silicon. The average particle diameter of silicon of silicon raw material powder A was 10 μm, and the average particle diameter of silicon of silicon raw material powder B was 8 μm. The average particle diameter of silicon of silicon raw material powder A and silicon raw material powder B was measured using a laser diffraction/diffusion type particle diameter distribution analyzer ("Micro-track" (product name)" produced by Nikkiso Co., ltd.)

TABLE 1

|  | | Silicon raw material powder | | Eutectic point |
|---|---|---|---|---|
|  | | A | B | (° C.) |
| Composition (mass %) | Si | 99.70 | 99.10 | — |
|  | Al | 0.08 | 0.27 | 577 |
|  | Fe | 0.08 | 0.42 | 1203 |
|  | Ti | — | 0.03 | 1330 |
|  | Ca | 0.02 | 0.04 | 1030 |
|  | Zr | — | — | 1370 |
|  | Mg | 0.04 | 0.04 | 946 |
|  | K | — | — | — |
|  | Na | 0.02 | 0.02 | — |
|  | V | — | 0.04 | 1400 |
|  | Cr | — | — | 1305 |
|  | Mn | — | — | 1149 |
|  | Ni | — | 0.02 | 993 |
|  | Mo | — | — | 1400 |
|  | B | — | — | 1385 |
|  | P | — | — | 1131 |

Example 1

In Example 1, silicon raw material powder A was used as the silicon raw material powder. For the forming raw material, 5,000 g of silicon raw material powder A and 350 g of methylcellulose as binder as well as appropriate amount of water added were prepared.

Next, the obtained forming raw material was kneaded by a kneader, and then was pugged by a vacuum pugmill to form a kneaded material. Next, the obtained kneaded material was extruded to prepare a honeycomb formed body. The honeycomb formed body was such that the partition wall thereof after firing had the thickness of 300 μm, and the cell density of 46.5 cells/cm². The honeycomb structure body of the honeycomb formed body was a quadrangular pillar shape, in which the length of one side of the end face was 35 mm after firing. Next, the honeycomb formed body was dried to obtain a honeycomb dried body. Drying included microwave drying, followed by hot air drying at 80° C.

Next, the obtained honeycomb dried body was degreased. Degreasing was performed in the air at 450° C. for 5 hours. Next, the degreased honeycomb dried body was fired in the Ar atmosphere to obtain a honeycomb structure. Firing in Example 1 was performed, including temperature rising to 1,200° C. in 2 hours firstly, followed by temperature rising to 1,400° C. in 0.5 hour and then the temperature was kept at 1,400° C. for 2 hours. Hereinafter this temperature condition for firing is called "firing condition a".

The composition of the partition wall (porous body) making up the honeycomb structure of Example 1 was determined and the amount thereof was determined by the following method. Table 2 shows the composition of the partition wall (porous body) making up the honeycomb structure of Example 1. Herein, the field of "each crystalline phase (mass %) accounting for in the porous body (crystalline substance)" in Table 2 indicates the result of identification of the crystalline phases included in the porous body and the result of the amount thereof determined. The components identified as crystalline phases included in the porous body were four components of silicon, cristobalite ($SiO_2$), cordierite ($2MgO \cdot 2Al_2O_3 \cdot 5SiO_2$), and $FeSi_2$ in Examples and Comparative Examples described in the following. The field of "content (parts by mass) to silicon" in Table 2 indicates the content ratio (parts by mass) of specific impurities with respect to 100 parts by mass of crystalline phase made of silicon. In Table 2, Fe was shown as the specific impurities. The field of "amount of oxide (mass %)" in Table 2 indicates the mass ratio (mass %) of an oxide included in the porous body. The field of "amount of silicon phase (mass %)" in Table 2 indicates the mass ratio (mass %) of the silicon phase included in the porous body. The field of "amount of silicon (mass %)" in Table 2 indicates the mass ratio (mass %) of silicon (single body made of Si element) included in the porous body.

TABLE 2

|  | Each crystalline phase accounting for in porous body (crystalline substance) (mass %) | | | | Content to silicon (parts by mass) | Amount of oxide (mass %) | Amount of silicon phase (mass %) | Amount of silicon (mass %) |
|---|---|---|---|---|---|---|---|---|
|  | Silicon | Cristobalite | Cordierite | $FeSi_2$ | Fe |  |  |  |
| Ex. 1 | 99.7 | — | — | 0.3 | 0.15 | 1 | 99.0 | 98.7 |
| Ex. 2 | 99.0 | — | 0.8 | 0.2 | 0.10 | 2 | 98.0 | 97.8 |
| Ex. 3 | 96.6 | — | 3.2 | 0.2 | 0.10 | 5 | 95.0 | 94.8 |
| Ex. 4 | 96.6 | — | 3.2 | 0.2 | 0.10 | 5 | 95.0 | 94.8 |
| Ex. 5 | 89.9 | — | 9.9 | 0.2 | 0.11 | 14 | 86.0 | 85.8 |
| Ex. 6 | 73.0 | — | 26.9 | 0.1 | 0.07 | 29 | 71.0 | 70.9 |
| Ex. 7 | 94.6 | 5.2 | — | 0.2 | 0.11 | 6 | 94.0 | 93.8 |
| Comp. Ex. 1 | 99.0 | — | — | 1.0 | 0.50 | 1 | 99.0 | 98.0 |

The crystalline phases included in the porous body were identified, and the amount thereof was determined by the following method. Firstly, a test piece of a required amount for measurement was cut out from the porous body forming the partition wall of the honeycomb structure, and the cut-out test piece was pulverized into powder. Then, the diffraction pattern of the obtained powder was measured using an X-ray diffractometer (XRD). Thereafter the crystalline phase contained in the porous body was identified based on the measured diffraction pattern. Then the amount of the identified crystalline phase was determined by a Reference Intensity Ratio (RIR) method.

The content (parts by mass) of the specific impurities with respect to 100 parts by mass of silicon was calculated using the measurement result of the diffraction pattern by XRD descried above in the method for identifying crystalline phases. Specifically, for each crystalline phase including specific impurities out of the crystalline phases identified from the diffraction pattern, the content (mass %) of metal corresponding to the specific impurities was obtained using the atomic weight of each component, whereby the ratio (parts by mass) with respect to 100 parts by mass of silicon was calculated. For instance, when specific impurity A is identified as metal and metal making up silicide, calculation may be performed as in the following expression (1) to obtain the content (parts by mass) of specific impurity A. Since FeSi$_2$ was detected as specific impurity from the diffraction pattern obtained by XRD, the content (parts by mass) of Fe was obtained through calculation as in the following expression (1)'. Herein, when specific impurity A is identified as metal, calculation may be performed as in the following expression (1) while omitting B in the following expression (1), whereby the content (parts by mass) of specific impurity A can be obtained.

[Math. 1]

$$[\text{Content of specific impurity } A \text{ (part by mass)}] = \frac{A+B}{C} \quad (1)$$

$$[\text{Content of specific impurity } A \text{ (part by mass)}] = \frac{B}{C} \quad (1)'$$

A in the above expression (1) and (1)' denotes the "content (mass %) of specific impurity A as metal included in porous body (crystalline phase)". B denotes the product of "the content of silicide (mass %) including specific impurity A, included in porous body (crystalline phase)" and "the content (mass %) of specific impurity A in silicide including specific impurity A". C denotes the sum of "the content (mass %) of silicon included in porous body (crystalline phase)" and "the content (mass %) of silicon forming silicide".

The mass ratio (amount of oxide) of an oxide included in the porous body was measured by the following method. Firstly, a test piece of a required amount for measurement was cut out from the porous body forming the partition wall of the honeycomb structure, and the cut-out test piece was pulverized into powder. Then, the obtained powder was immersed in hydrofluoric acid so as to elute the oxide included in the porous body into the hydrofluoric acid. The mass ratio (mass %) of the oxide included in the porous body was obtained from a difference between the mass of the powder before elution and the mass of the powder as residue. Herein, the powder as residue refers to the powder that was collected after elution of the oxide into the hydrofluoric acid and then was dried. The mass of oxide was used to calculate the amount (mass %) of silicon phase described later.

The amount (mass %) of silicon phase was calculated by the following method. Firstly, the mass of an oxide included in the porous body was obtained in accordance with the aforementioned method for measuring the mass ratio of an oxide included in the porous body. Next, the mass of the oxide was subtracted from the total mass of the porous body, whereby the sum of mass of silicon and non-oxide such as silicide included in the porous body was calculated as in the following expression (2), and this value was used as the amount of silicon phase (mass %).

[Math. 2]

$$[\text{Amount of silicon phase (mass \%)}]=100-[\text{Amount of oxide (mass \%)}] \quad (2)$$

The amount of silicon (mass %) was calculated by the following method. The product of the amount of silicon phase (mass %) as stated above and "the amount of silicon (mass %) accounting for in the porous body (crystalline substance)" was obtained and the obtained product was divided by the "total amount (mass %) of silicon, metals other than silicon and silicide accounting for in the porous body (crystalline substance)". This value was used as the amount of silicon (mass %). A method for calculating the amount of silicon (mass %) is shown in the following expression (3). Herein, the silicide was FeSi$_2$ from the measurement result of XRD. No metals other than silicon were found in the measurement result of XRD.

[Math. 3]

$$[\text{Amount of silicon (mass \%)}] = \frac{[\text{Amount of silicon phase (mass \%)}] \times D}{E} \quad (3)$$

D in the above expression (3) is "the amount of silicon accounting for in porous body (crystalline substance)". E in the above expression (3) is "the total amount of silicon, metals other than silicon and silicide accounting for in the porous body (crystalline substance)".

For the obtained porous body forming the partition wall of the honeycomb structure, the bulk density (g/cm$^3$), the porosity (%), the average pore diameter (μm), the thermal diffusivity (mm$^2$/sec), the heat capacity (J/K/cm$^3$), the standard deviation of thickness of skeleton (μm), and the length of skeleton (μm) were obtained. Table 3 shows the results.

The bulk density (g/cm$^3$) and the porosity (%) were measured by the following method. A test piece of a required size for measurement was cut out from the porous body forming the partition wall of the honeycomb structure, and the bulk density (g/cm$^3$) and the porosity (%) of the test piece at room temperature were measured by the Archimedes's method (JIS R 1634). The real density (g/cm$^3$) of the test piece also was measured by this Archimedes's method.

The average pore diameter (μm) was measured by the following method. A test piece of a required size for measurement was cut out from the porous body forming the partition wall of the honeycomb structure, and the average pore diameter of the test piece was measured by a mercury intrusion technique (JIS R 1655).

The thermal diffusivity (mm$^2$/sec) was measured by the following method. The thermal diffusivity of a porous body at 800° C. was measured by a laser flash method ("TC7000 (product name)" produced by Ulvac-Riko Inc.). The reason for the value of thermal diffusivity at 800° C. was evaluated in the present example as follows. When a honeycomb structure is used as a DPF, the temperature of the filter reaches 600° C. or more due to the combustion of soot trapped during the regeneration of the DPF. Since the influences of thermal diffusivity become noticeable particularly under such a temperature condition, thermal diffusivity was evaluated using the value of thermal diffusivity at 800° C.

The heat capacity (J/K/cm$^3$) was measured by the following method. Firstly, a test piece of a required amount for measurement was cut out from the porous body forming the partition wall of the honeycomb structure, and the cut-out test piece was pulverized into powder. Next, heat capacity (J/K/g) per unit mass of the obtained powder at 400° C. was measured using an insulated specific heat measurement device produced by Ulvac-Riko Inc. Next, the obtained heat capacity (J/K/g) per unit mass was multiplied by the real density (g/cm$^3$) at the room temperature measured by the Archimedes's method, whereby the heat capacity per unit volume (J/K/cm³) was calculated. This means that such heat capacity (J/K/cm³) is the heat capacity of the material itself making up the porous body without considering the pores formed in the porous body. Herein, the reason for the value of heat capacity at 400° C. was evaluated in the present example as follows. When a honeycomb structure is used as a DPF, forced heating till the combustion temperature of soot is about 200 to 600° C. during the regeneration of the DPF. Since the influences of heat capacity become noticeable particularly under such a temperature condition, heat capacity was evaluated using the value of heat capacity at 400° C.

The standard deviation of the thickness of skeleton of the porous body was obtained as follows. Firstly, a test piece of a required size for measurement was cut out from the porous body forming the partition wall of the honeycomb structure. Next, the cutting plane of the obtained test piece was embedded in resin. Thereafter, the cutting plane of the test piece was ground, and such a cutting plane was observed by a SEM to take a reflecting electron image at 200-fold magnification. The rectangular range of 300 μm×600 μm at the partition wall part of the obtained image was analyzed using image analysis software to calculate standard deviation of the thickness of skeleton. Specifically the obtained SEM image was binarized, and a distance map was created for the part corresponding to a silicon phase as a main phase in the binarized image. Next, the average density at each silicon phase was obtained using the obtained image, and then the average density was used as the thickness of skeleton of the corresponding silicon phase. Then, the standard deviation of the thicknesses of skeleton for the silicon phases was obtained, which was used as the standard deviation of the thickness of skeleton of the porous body. The image analysis software used was "Image-Pro Plus 7.0J" (product name) produced by Media Cybernetics Inc.

The average of the length of skeleton of the porous body was obtained as follows. Firstly a binarized image was created similarly to the method to obtain the standard deviation of the thickness of skeleton of the porous body. Next, the center line of each silicon phase was extracted by thinning processing, and each center line was used as the skeleton of the corresponding silicon phase. Then the average of the lengths of skeleton of the silicon phases was used as the average of the length of skeleton of the porous body.

Figure 10:
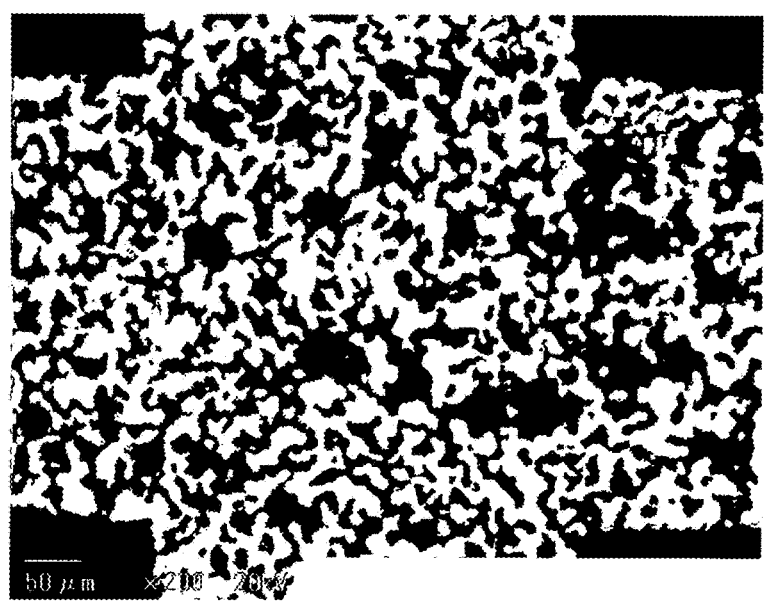
FIG. 10 shows a photo taken of a reflecting electron image of the honeycomb structure of Example 1 by a scanning electron microscope.

Further, the state of the partition wall of the honeycomb structure of Example 1 was observed using a scanning electron microscope. The observation using a scanning electron microscope was performed as follows. Firstly a test piece of a required size for measurement was cut out from the honeycomb structure. Next, the cutting plane of the obtained test piece was embedded in resin, and the cutting plane of the test piece was ground. Then, the ground plane of the test piece was observed at 200-fold magnification. FIG. 10 shows a photo taken of a reflecting electron image of the honeycomb structure of Example 1 by a scanning electron microscope.

The partition wall of the honeycomb structure of Example 1 was formed by a porous body including a silicon phase as the main phase. Then, the silicon phase as the main phase had the content of each of the metals other than silicon and the metals (specific impurities) making up silicide that was 0.3 part by mass or less with respect to 100 parts by mass of silicon.

Example 2

In Example 2, silicon raw material powder A was used as the silicon raw material powder. For the forming raw material, 5,000 g of silicon raw material powder A, 50 g of cordierite powder with the average particle diameter of 2 μm, and 350 g of methylcellulose as binder as well as appropriate amount of water added were prepared. Then a honeycomb structure was obtained using the obtained forming raw material similarly to Example 1 other than that the temperature condition for firing was changed as follows. Firing in Example 2 was performed, including temperature rising to 1,200° C. in 2 hours firstly, followed by temperature rising to 1,400° C. in 20 hours and then the temperature was kept at 1,400° C. for 2 hours. Firing was performed in the Ar atmosphere. Hereinafter this temperature condition for firing is called "firing condition b".

Example 3

In Example 3, a honeycomb structure was obtained similarly to Example 2 other than that the amount of cordierite powder to be added to the forming raw material was changed to 221 g.

Example 4

In Example 4, a honeycomb structure was obtained similarly to Example 3 other than that the temperature condition for firing was changed as follows. Firing in Example 4 was performed, including temperature rising to 1,200° C. in 2 hours firstly, followed by temperature rising to 1,400° C. in 67 hours and then the temperature was kept at 1,400° C. for 2 hours. Firing was performed in the Air atmosphere. Hereinafter this temperature condition for firing is called "firing condition c".

TABLE 3

| | Bulk density (g/cm³) | Porosity (%) | Average pore diameter (μm) | Thermal diffusivity (mm²/sec) | Heat capacity (J/K/cm³) | Oxide particle diameter (μm) | Standard deviation of thickness of skeleton (μm) | Average length of skeleton (μm) |
|---|---|---|---|---|---|---|---|---|
| Ex. 1 | 1.26 | 46 | 8 | 7.0 | 2.03 | — | 0.5 | 100 |
| Ex. 2 | 1.31 | 43 | 8 | 7.2 | 2.03 | 2.5 | 0.4 | 149 |
| Ex. 3 | 1.48 | 37 | 6 | 8.5 | 2.09 | 3.0 | 0.4 | 315 |
| Ex. 4 | 1.52 | 35 | 6 | 8.9 | 2.08 | 3.2 | 0.5 | 317 |
| Ex. 5 | 1.55 | 34 | 5 | 8.1 | 2.14 | 3.9 | 0.5 | 313 |
| Ex. 6 | 1.63 | 32 | 5 | 6.7 | 2.30 | 4.8 | 0.5 | 312 |
| Ex. 7 | 1.37 | 40 | 6 | 6.1 | 2.04 | — | 0.5 | 104 |
| Comp. Ex. 1 | 1.27 | 46 | 23 | 6.0 | 2.06 | — | 2.6 | 81 |

Example 5

In Example 5, a honeycomb structure was obtained similarly to Example 4 other than that the amount of cordierite powder to be added to the forming raw material was changed to 739 g.

Example 6

In Example 6, a honeycomb structure was obtained similarly to Example 4 other than that the amount of cordierite powder to be added to the forming raw material was changed to 2,000 g.

Example 7

In Example 7, a honeycomb structure was firstly obtained by the method similar to Example 1. Then, the obtained honeycomb structure was heat-treated so as to form an oxide made of $SiO_2$ at the surface of the silicon phase as the main phase of the porous body. The heat treatment was performed in the atmosphere of air at the temperature of 1,250° C. For Example 7, a test piece was cut out from the porous body forming the partition wall of the obtained honeycomb structure, and the fracture plane of the obtained test piece was observed using a SEM. The result of this observation showed that a substance assumed as the second-form oxide at the surface of the silicon phase, and then the element thereof was specified using an EDS. As a result, Si and O were detected at the surface of the silicon phase, and Si only was detected inside of the silicon phase, and so it was determined that $SiO_2$ was present at the surface of the silicon phase. That is, $SiO_2$ in the second form was present in the honeycomb structure of Example 7.

Comparative Example 1

Figure 11:
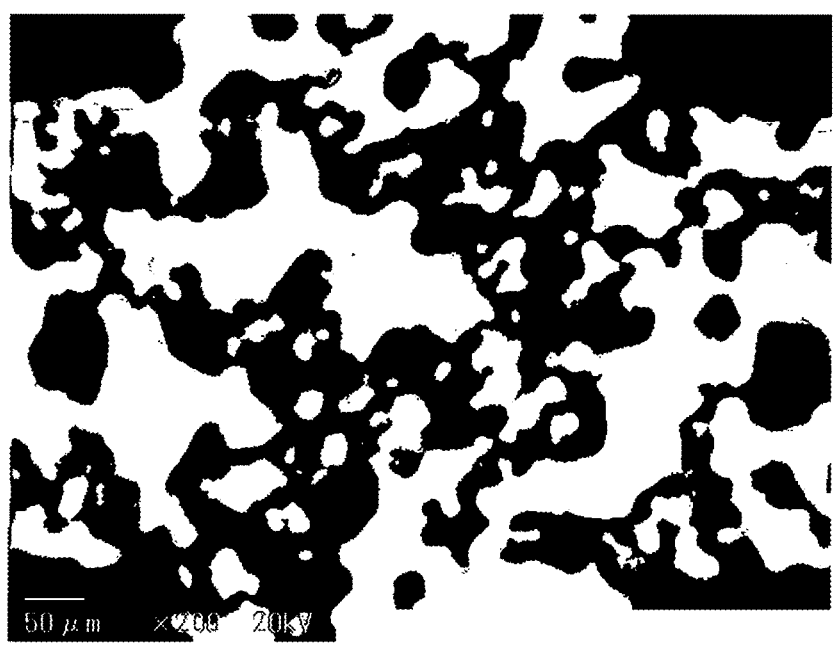
FIG. 11 shows a photo taken of a reflecting electron image of the honeycomb structure of Comparative Example 1 by a scanning electron microscope.

In Comparative Example 1, a honeycomb structure was obtained similarly to Example 1 other than that silicon raw material powder B was used as the silicon raw material powder. The state of the partition wall of the honeycomb structure of Comparative Example 1 was observed using a scanning electron microscope. The observation using a scanning electron microscope was performed similarly to Example 1. FIG. 11 shows a photo taken of a reflecting electron image of the honeycomb structure of Comparative Example 1 by a scanning electron microscope.

RESULTS

The partition wall of the honeycomb structure of Example 1 had small standard deviation of the thickness of skeleton of the porous body and had a large average of the length of skeleton of the porous body as compared with the partition wall of the honeycomb structure of Comparative Example 1. Due to such a microstructure of the porous body achieved, the partition wall of the honeycomb structure of Example 1 had high thermal diffusivity.

In the honeycomb structures of Examples 2 and 3, the porous body forming the partition wall included a specific oxide as well as the silicon phase as the main phase. The honeycomb structures of Examples 2 and 3 had low porosity and high thermal diffusivity as compared with the honeycomb structure of Example 1. It was confirmed that the honeycomb structures of Examples 2 and 3 had better tendency of the microstructure of the porous body as well, as compared with the honeycomb structure of Example 1.

The honeycomb structure of Example 4 was manufactured by changing the firing condition. When firing was performed under firing condition c, it achieved low porosity and high thermal diffusivity as compared with the honeycomb structure of Example 3 through the firing under firing condition b.

The honeycomb structure of Example 5 had an increased amount of oxide as compared with the honeycomb structure of Example 4. The honeycomb structure of Example 5 had slightly decreased porosity and decreased thermal diffusivity as compared with the honeycomb structure of Example 4.

The honeycomb structure of Example 6 had a further increased amount of oxide as compared with the honeycomb structure of Example 5. The honeycomb structure of Example 6 had slightly decreased porosity as compared with the honeycomb structure of Example 5. However, the thermal diffusivity thereof was decreased relatively largely. The result of Examples 5 and 6 shows that, although a certain degree of amount of an oxide included in the porous body contributes to lower porosity and increase thermal diffusivity, too much amount of an oxide leads to a large decrease in thermal diffusivity.

The honeycomb structure of Example 7 was manufactured by performing heat treatment in the air of the honeycomb structure of Example 1. The honeycomb structure of Example 7 had an oxide made of $SiO_2$ at the surface of the silicon phase as the main phase of the porous body, and so had excellent heat resistance.

The honeycomb structure of Comparative Example 1 contained specific impurities more than the honeycomb structure of Example 1. Therefore, the honeycomb structure of Comparative Example 1 had a microstructure of the porous body having difficulty in thermal diffusion, and so had low thermal diffusivity as compared with the honeycomb structure of Example 1. The honeycomb structure of Comparative Example 1 is expected to have low strength of the honeycomb structure and such trapping performance when the honeycomb structure is used as a filter.

The honeycomb structure of the present invention is available as an exhaust-gas purification filter to purify exhaust gas and as a catalyst carrier.

DESCRIPTION OF REFERENCE NUMERALS 1, 21, 41, 61: partition wall
2, 22, 42, 62: cell
22a: cell (predetermined cell)
22b: cell (residual cell)
3, 23, 43, 63: circumferential wall
4, 24, 44, 64: honeycomb structure body
11, 31, 51, 71: first end face
12, 32, 52, 72: second end face
25: plugging portion
46: honeycomb segment
47: bonding layer
48: outer wall (outer wall of honeycomb segment)
69: electrode member
100, 200, 300, 400: honeycomb structure

What is claimed is:
1. A fired honeycomb structure, comprising a pillar-shaped honeycomb structure body having a plurality of porous partition walls, wherein
the honeycomb structure body includes a plurality of cells defined by the plurality of porous partition walls so as to extend from a first end face to a second end face of the honeycomb structure body, the plurality of porous partition walls are formed by a porous body including 60 mass % or more of a silicon phase as a main phase, and the silicon phase as the main phase has content of each of metals other than silicon and metals making up silicide that is 0.3 part by mass or less with respect to 100 parts by mass of silicon.

2. The fired honeycomb structure according to claim 1, wherein the porous body includes 70 mass % or more of the silicon phase as the main phase.

3. The fired honeycomb structure according to claim 1, wherein the silicon phase as the main phase includes, as the metals other than silicon and the metals making up silicide, at least one metal selected from the group consisting of Fe, Ca, Al, Ti, and Zr.

4. The fired honeycomb structure according to claim 1, wherein the porous body includes an oxide, and the oxide includes at least $SiO_2$.

5. The fired honeycomb structure according to claim 4, wherein the porous body includes 1 to 30 mass % of the oxide.

6. The fired honeycomb structure according to claim 4, wherein
in a first form of the silicon phase and the oxide present in the porous body, the silicon phase as the main phase includes a plurality of silicon particles, and the oxide is present between the plurality of silicon particles.

7. The fired honeycomb structure according to claim 6, wherein the oxide in the first form has a particle diameter of 5 μm or less.

8. The fired honeycomb structure according to claim 4, wherein the oxide includes a first oxide made of MgO, $Al_2O_3$ and $SiO_2$.

9. The fired honeycomb structure according to claim 4, wherein
in a second form of the silicon phase and the oxide present in the porous body, the oxide is present at a surface of the silicon phase as the main phase.

10. The fired honeycomb structure according to claim 4, wherein the oxide includes a second oxide made of $SiO_2$.

11. The fired honeycomb structure according to claim 4, wherein the oxide includes any one or more of cordierite and cristobalite.

12. The fired honeycomb structure according to claim 1, wherein the porous body has standard deviation of a thickness of skeleton that is 2 μm or less.

13. The fired honeycomb structure according to claim 1, wherein the porous body has an average of a length of skeleton that is 90 μm or more.

14. The fired honeycomb structure according to claim 1, wherein the porous body has porosity of 25 to 65%.

15. The fired honeycomb structure according to claim 1, wherein the porous body has an average pore diameter of 5 to 40 μm.

16. The fired honeycomb structure according to claim 1, further comprising a plugging portion at the first end face and the second end face of the honeycomb structure body so as to plug an open end of at least one of the cells.

17. The fired honeycomb structure according to claim 1, wherein the honeycomb structure body is formed by a honeycomb segment bonded member including a plurality of honeycomb segments that are bonded while being displaced adjacent to each other so that side faces thereof are opposed.

18. The fired honeycomb structure according to claim 1, wherein the honeycomb structure body includes a circumferential wall disposed so as to surround circumference of the honeycomb structure body, and the circumferential wall has a pair of electrode members.

* * * * *